US010652827B2

(12) United States Patent
Ganesan et al.

(10) Patent No.: US 10,652,827 B2
(45) Date of Patent: May 12, 2020

(54) TECHNIQUES FOR CONGESTION MITIGATION IN A RADIO ACCESS NETWORK

(71) Applicant: HUAWEI TECHNOLOGIES CO., LTD., Shenzhen, Guangdong (CN)

(72) Inventors: Karthikeyan Ganesan, Munich (DE); Liang Hu, Shenzhen (CN); Ali Ramadan, Munich (DE); Swaroop Nunna, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/510,341

(22) Filed: Jul. 12, 2019

(65) Prior Publication Data

US 2019/0335397 A1  Oct. 31, 2019

Related U.S. Application Data

(63) Continuation of application No. PCT/EP2017/050699, filed on Jan. 13, 2017.

(51) Int. Cl.
*H04W 74/08* (2009.01)
*H04W 74/00* (2009.01)
(Continued)

(52) U.S. Cl.
CPC ....... *H04W 52/0235* (2013.01); *H04W 68/02* (2013.01); *H04W 4/40* (2018.02); *H04W 4/70* (2018.02)

(58) Field of Classification Search
CPC ........... H04W 74/085; H04W 74/0833; H04W 52/0235
See application file for complete search history.

(56) References Cited

U.S. PATENT DOCUMENTS 9,532,385 B2 * 12/2016 Lee ..................... H04W 74/085
2011/0305215 A1   12/2011 Hofmann et al.
(Continued)

FOREIGN PATENT DOCUMENTS

| CN | 102300294 A | 12/2011 |
|----|-------------|---------|
| CN | 103813286 A | 5/2014  |
| CN | 105898894 A | 8/2016  |

OTHER PUBLICATIONS

Da Silva et al., "A novel state model for 5G Radio Access Networks", IEEE ICC2016—Workshops: W09—Workshop on 5G RAN Design, XP032919936, 6 pages.
(Continued)

*Primary Examiner* — Gary Lafontant
(74) *Attorney, Agent, or Firm* — Fish & Richardson P.C.

(57) ABSTRACT

The disclosure relates to user equipment (UE) (700), comprising: a transceiver (701) configured to transceive radio resource control (RRC) messages between the UE (700) and a radio access network (RAN); and a radio resource controller (702) configured to activate an operation mode of the UE (700) responsive to processing a first sequence (328) of RRC messages when a non-congestion situation is indicated by the RAN, wherein the radio resource controller (702) is configured to activate the operation mode of the UE (700) responsive to processing a second sequence (525, 625) of RRC messages when a special situation, in particular a congestion situation or a power saving situation to reduce the energy consumption, is indicated by the RAN, wherein a latency for processing the second sequence (525, 625) of RRC messages is less than a latency for processing the first sequence (328) of RRC messages.

21 Claims, 8 Drawing Sheets

(51) Int. Cl.
    *H04W 52/02*     (2009.01)
    *H04W 68/02*     (2009.01)
    *H04W 4/70*     (2018.01)
    *H04W 4/40*     (2018.01)

(56) References Cited

U.S. PATENT DOCUMENTS

| | | |
|---|---|---|
| 2013/0242726 A1 | 9/2013 | Zhu et al. |
| 2014/0133416 A1 | 5/2014 | Kubota et al. |
| 2014/0269475 A1 | 9/2014 | Ehsan et al. |
| 2019/0082490 A1 | 3/2019 | Zhang et al. |

OTHER PUBLICATIONS

PCT International Search Report and Written Opinion in International Application No. PCT/EP2017/050,699, dated Sep. 21, 2017, 13 pages.
Samsung, "Data transfer in inactive state based on 4-step RACH procedures," 3GPP TSG-RAN WG2 #97, R2-1701529 (resubmission of R2-1700366); Athens, Greece, Feb. 13-17, 2017, 7 pages.
Huawei et al.,"Consideration on grant free transmission for NR," 3GPP TSG-RAN WG2 Meeting #94, R2-164131; Nanjing, China, May 23-27, 2016, 3 pages.
Samsung, "NR RRC state machine, transitions and signalling procedures," 3GPP TSG-RAN WG2 Meeting #96, R2-167494; Reno, USA, Nov. 14-18, 2016, 6 pages.
Office Action issued in Chinese Application No. 201780083323.3 dated Mar. 20, 2020, 14 pages.

\* cited by examiner

TECHNIQUES FOR CONGESTION MITIGATION IN A RADIO ACCESS NETWORK

CROSS-REFERENCE TO RELATED APPLICATIONS

This application is a continuation of International Application No. PCT/EP2017/050699, filed on Jan. 13, 2017, the disclosure of which is hereby incorporated by reference in its entirety.

TECHNICAL FIELD

The present disclosure relates to a User Equipment (UE) comprising a radio resource controller (RRC) activating an operation mode of the UE based on a congestion or power-saving situation indicated by a radio access network (RAN) and to a RAN entity indicating such situation to the UE. In particular, the present disclosure relates to techniques for congestion mitigation in RAN and also for power saving for machine-type communication (MTC) devices, particularly for C-V2X (cellular assisted vehicle-to-anything).

BACKGROUND

In current radio communication networks, the number of connected users that can be supported by the base station (BS) is quite limited due to various factors as described in the following. Higher layers session management for managing static radio bearers (SRBs) and dynamic radio bearers (DRBs) includes a maximum number of supported bearers based on a Quality of Service (QoS) criterion. With respect to lower layers, bandwidth, control channel capacity and data channel capacity are limited. With respect to CPU resource, the maximum UE processing time per TTI (transmission time interval) is limited. In C-V2x (cellular assisted vehicle-to-anything) networks, there can be congestion in the Uu link with respect to data and control channel in the physical layer. During power saving mode periodic data transmission is applied for MTC devices with periodic data transmission. In cellular assisted V2V (vehicle-to-vehicle) connection where BS provides resource allocation for D2D (device-to-device) users, the congestion can happen in the Uu link due to control channel capacity; then the connection is established in Mode-2 (ad-hoc mode with pre-defined allocation from resource pools) which may also result in very high Interference and/or congestion in the PC5 band. Scheduling the users in time domain results in solving the problem with respect to the data channel but would result in an increased latency. Hence, scheduling in time domain would be fine for latency insensitive traffic but most of the V2x traffic is latency bound.

In vehicle-to-anything (V2x) scenarios, there are situations such as traffic jams in a highway with many lanes where there are a lot of V-UEs (vehicular user equipments) that do not move much or move slowly in low mobility or medium mobility scenarios implying that most of them need to be connected to the same cell resulting in RAN congestion. For these V2x scenarios vehicular UEs need periodic transmission of basic safety message, download information updates from cloud etc. which requires a connection to the network.

For MTC devices power and processing power is limited and hence there is a requirement to extend the MTC devices battery life to a longer time, for example to about 20 years.

Hence there is a need for solving the congestion problem in a base-station in case of C-V2x and also extend the battery life by saving processing power for periodic data transmission in MTC scenarios.

SUMMARY

It is the object of the invention to provide a technology for solving the above described congestion problem in mobile communication systems, in particular in the radio access network for cellular assisted V2x communication. It is a further object of the invention to provide a concept for extending the battery life of MTC devices by limiting the processing power of these MTC devices.

This object is achieved by the features of the independent claims. Further implementation forms are apparent from the dependent claims, the description and the figures.

The main idea of the invention is to provide Semi-persistent or persistent radio resource control (RRC) modes for periodic data transmission and to reduce the latency involved with re-attaching the UE to the RAN. By using the invention, a reduction of the latency can be achieved, for example from a latency including paging, random access (RA) messaging, RAN context fetching and 1.5 RTT (round trip time) for RRC (radio resource control) message exchanging down to a latency including RAN context fetching and 1.0 RTT for RRC message exchanging. Such reduction of latency can be achieved, for example by omitting the paging and RA messages as shown hereinafter. However, considering the unique properties of MTC devices with very low traffic volume and periodic nature of data transmission and waiting for no follow up packets it is expected that waiting for the next packet in RRC Connected state will cause unnecessary energy consumption.

The disclosure presents solutions for solving this congestion problem. The following four solution aspects are presented hereinafter: A first solution aspect as described below is related to new signaling and UE behaviors at Radio resource control between Base-station and UE to make periodic transition of UE from connected mode to connected in-active mode with faster re-attachment to the network with the help of semi-persistent or persistent timers provided to UE RRC protocol. A second solution aspect as described below is related to new radio layer message configuring RAN controlled RRC SPS mode and UE controlled RRC SPS mode with fast access to network from stored UE context info. A third solution aspect as described below is related to activating the semi-persistent transition in radio resource control and the periodicity of the transition between BS and UE based on traffic pattern. A fourth solution aspect as described below is related to updating the stored RAN context with updated information from measurement report when the UE is in connected mode.

The disclosed SPS RRC mode as described hereinafter can solve the congestion problem in RAN experiencing heavy load and can provide fairness to all UEs that like to get connected to the network and transmit/receive data and updates from the cloud. Also since the MTC devices are no longer needed to monitor for paging message in connected in-active mode, energy consumption is reduced. The disclosed Periodic RRC SPS mode as described hereinafter helps congested UEs to access the network while utilizing the resources such as SRBs, DRBs, bandwidth, control channel/data channel during the transient period. The disclosed semi-persistent timer for RRC mode as described hereinafter is light weight and supports UE faster re-attachment from connected in-active mode to connected mode with RAN memory and traffic pattern which is exploited by the base-station by configuring SPS RRC transition instead of waiting for traffic and initiating paging.

The devices and systems described herein may be implemented in wireless communication networks, in particular communication networks based on mobile communication standards such as LTE, in particular LTE-A and/or OFDM and 5G. The devices and systems described herein may be designed in accordance to mobile communication standards such as e.g. the Long Term Evolution (LTE) standard or the advanced version LTE-A thereof. LTE (Long Term Evolution), marketed as 4G and 5G LTE and beyond, is a standard for wireless communication of high-speed data for mobile phones and data terminals. The devices described herein may be applied in OFDM systems where digital data is encoded on multiple carrier frequencies.

The devices described herein may further be implemented in base stations (or NodeBs or eNodeBs or radio cells) and in communication devices such as mobile devices (or mobile stations or User Equipments (UEs)), for example in the scenario of machine-to-machine (M2M) communication enabling networked devices to exchange information and perform actions without the manual assistance of humans or in the scenarios of machine-type communication (MTC) or device-to-device (D2D) or vehicle-to-anything (V2X) communication where one mobile device communicates with another mobile device (either by using a communication path traversing the base station or by a communication path non-traversing the base station). Vehicle-to-everything (V2X) communication is the passing of information from a vehicle to any entity that may affect the vehicle, and vice versa.

The devices and systems described herein may be designed in accordance to Next Generation (NG) radio networks, e.g. according to "https://metis-ii.5g-ppp.eu/wp-content/uploads/publications/2016/2016-05-ICC-A-novel-state-model-for-5G-radio-access-networks.pdf"; "3GPP TR 23.799—Study on architecture for next generation system, in particular Section 6.3.5 —context cookie creation"; "3GPP TS 26.213—Evolved Universal Terrestrial Radio Access (E-UTRA); Physical layer procedures"; and "3GPP LTE-V2X Technical Report: 3GPP 36.885: http://www.tech-invite.com/3m36/tinv-3gpp-36-885.html".

The described devices and systems may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices described herein may be configured to transmit and/or receive radio signals. Radio signals may be or may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

In order to describe the invention in detail, the following terms, abbreviations and notations will be used:
RAN: Radio Access Network
RRC: Radio Resource Control or Radio Resource Controller
MTC: Machine-Type Communication (device)
M2M: Machine-to-Machine (communication)
D2D: Device-to-device
V2X: Vehicle-to-everything
V2V: Vehicle-to-Vehicle
OFDM: Orthogonal Frequency Division Multiplex
BS: Base Station, eNodeB, eNB, radio cell
UE: User Equipment, e.g. a mobile communication device or a machine type communication device
4G: $4^{th}$ generation according to 3GPP standardization
5G: $5^{th}$ generation according to 3GPP standardization
LTE: Long Term Evolution
RF: Radio Frequency
DRX: Discontinuous Reception
RLF: Radio Link Failure
SPS: Semi-Persistent
RA: Random Access
CN: Core Network
SRB: Static Radio Bearer
DRB: Dynamic Radio Bearer
RTT: Round Trip Time According to a first aspect, the invention relates to a user equipment (UE), comprising: a transceiver configured to transceive radio resource control (RRC) messages between the UE and a radio access network (RAN); and a radio resource controller configured to activate an operation mode of the UE responsive to processing a first sequence of RRC messages when a non-congestion situation is indicated by the RAN, wherein the radio resource controller is configured to activate the operation mode of the UE responsive to processing a second sequence of RRC messages when a special situation, in particular a congestion situation or a power saving situation, is indicated by the RAN, wherein a latency for processing the second sequence of RRC messages is less than a latency for processing the first sequence of RRC messages.

By processing the second sequence of RRC messages in a congestion or power saving situation which second sequence has a less processing latency than the first sequence of RRC messages, this latency reduction results in faster processing and therefore resolving of congestion. When the congestion or power down situation is over, which can be determined by the RAN and indicated to the UE, the UE can change to the normal state for processing the first sequence of RRC messages (first sequence of RRC message means always in connected mode) which have higher latency requirements. However, these higher latency requirements can be fulfilled in the normal situation where no congestion is detected or the UE is not in power-down mode.

In a first possible implementation form of the UE according to the first aspect, processing the first sequence of RRC messages comprises paging messaging, random access (RA) messaging, RRC messaging and RAN context fetching; and processing the second sequence of RRC messages comprises RRC messaging and RAN context fetching.

This provides the advantage that in the congestion or power-down situation, only the necessary messages are processed in order to mitigate congestion, that are RRC messaging and RAN context fetching, while in the normal situation, i.e. no congestion or power-down, further messages can be processed to improve the variability of the UE.

In a second possible implementation form of the UE according to the first aspect as such or according to the first implementation form of the UE, the radio resource controller is configured to omit paging messaging and RA messaging when processing the second sequence of RRC messages in order to reduce a latency for activating the operation mode of the UE.

This provides the advantage that omitting paging messaging and RA messaging reduces the latency when in a congestion or power-down situation in order to mitigate congestion. This saves the time the UE is waiting for traffic and initiating paging.

In a third possible implementation form of the UE according to the first aspect as such or according to any of the preceding implementation forms of the UE, the operation mode of the UE is activated by attaching the UE to the RAN, in particular by a state change of the UE from RRC connected in-active mode to RRC connected mode.

This provides the advantage that the mitigation of congestion can be performed when the UE is attached to the RAN (Connected mode) and receives a lot of messages that may result in congestion. While in the other situation when the UE is not attached to the RAN (Connected In-active mode) no messages are received and no congestion may happen, thus no mitigation of congestion is necessary.

In a fourth possible implementation form of the UE according to the third implementation form of the UE, the radio resource controller is configured to activate periodic transition between the RRC connected mode and the RRC connected in-active mode when a congestion situation or a power saving situation is indicated by the RAN.

This provides the advantage that periodic transition between the RRC connected mode and the RRC connected in-active mode helps the base station (or the RAN) to provide opportunities for all congested UEs to transmit data and therefore, to mitigate or at least reduce congestion.

In a fifth possible implementation form of the UE according to any of the third to the fourth implementation forms of the UE, the radio resource controller is configured to periodically activate and release radio bearers, in particular at least one static radio bearer (SRB) and/or at least one dynamic radio bearer (DRB), when a congestion situation or a power saving situation is indicated by the RAN.

This provides the advantage that periodic activation and release of radio bearers helps the base station (or the RAN) to provide opportunities for all congested UEs to transmit data and therefore, to mitigate or at least reduce congestion. This helps congested UEs to access the network while utilizing the resources such as SRBs and DRBs during the transient period.

In a sixth possible implementation form of the UE according to any of the third to the fifth implementation forms of the UE, the transceiver is configured to transmit measurement reports, in particular including buffer status report (BSR) information and Timing advance information to the RAN in RRC connected mode to enable the RAN updating a RAN context based on the measurement reports.

This provides the advantage that the RAN can update a RAN context by using the measurement reports. Hence, a current RAN context can be saved and reacquired at a later stage. When updating the RAN context, the RAN does not have to start from scratch; this saves signaling messages and therefore reduces latency.

In a seventh possible implementation form of the UE according to the first aspect as such or according to any of the preceding implementation forms of the UE, the radio resource controller is configured to change the operation mode of the UE based on a state machine, the state machine comprising a semi-persistent (SPS) RRC mode associated with the processing of the second sequence of RRC messages and a normal RRC mode associated with the processing of the first sequence of RRC messages.

This provides the advantage that activation of the operation mode of the UE can be simply performed by implementing the state machine, e.g. by an algorithm as software or by hardware. Such state machine can simply model communication between the UE and the RAN.

In an eighth possible implementation form of the UE according to the seventh implementation form of the UE, the radio resource controller is configured to periodically activate the SPS RRC mode when a congestion situation or a power saving situation is indicated by the RAN.

This periodic activation of the SPS RRC mode helps congested UEs to access the network in order to mitigate congestion.

In a ninth possible implementation form of the UE according to the eighth implementation form of the UE, the radio resource controller is configured to change the operation mode of the UE from the SPS RRC mode to the normal RRC mode responsive to a first timer expiry event of a first timer.

This provides the advantage that periodicity of the transition between SPS RRC mode and normal RRC mode can be configured by adjusting the first timer.

In a tenth possible implementation form of the UE according to the ninth implementation form of the UE, the first timer is configurable by the RAN.

This provides the advantage that periodicity of the transition between SPS RRC mode and normal RRC mode can be configured by the RAN, e.g. depending on the traffic situation and requirements determined by the operator.

In an eleventh possible implementation form of the UE according to any of the seventh to the tenth implementation forms of the UE, the radio resource controller is configured to periodically activate changing of the operation mode of the UE from RRC connected mode to RRC connected in-active mode when the UE is in the SPS RRC mode.

This provides the advantage that the same states "RRC connected mode" and "RRC connected in-active mode" as in RRC normal mode are also available in SPS RRC mode while only transitions between these two states are different from RRC normal mode.

In a twelfth possible implementation form of the UE according to the eleventh implementation form of the UE, the radio resource controller is configured to change the operation mode of the UE from the RRC connected in-active mode to the RRC connected mode responsive to a second timer expiry event of a second timer.

This provides the advantage that the periodicity of the transition between RRC connected in-active mode and RRC connected mode in the SPS RRC mode can be configured by adjusting the second timer.

In a thirteenth possible implementation form of the UE according to the twelfth implementation form of the UE, the radio resource controller is configured to release radio bearers, in particular at least one static radio bearer (SRB) and/or at least one dynamic radio bearer (DRB), for usage by another UE during activity of the second timer.

This provides the advantage that by releasing the radio bearers other congested UEs can acquire these radio bearers to attach to the RAN and to resolve congestion.

In a fourteenth possible implementation form of the UE according to any of the twelfth to the thirteenth implementation forms of the UE, the radio resource controller is configured to transmit an RRC connection resume request message to the RAN for resuming an RRC connection to the RAN responsive to the second timer expiry event.

This provides the advantage that by transmitting that RRC connection resume request message to the RAN, the UE can control the RRC SPS mode. I.e., UE controlled RRC SPS mode can be provided beside RAN controlled RRC SPS mode.

In a fifteenth possible implementation form of the UE according to the fourteenth implementation form of the UE, the radio resource controller is configured to transmit the RRC connection resume request message based on predefined radio resource blocks and/or grant free subcarrier multiple access (SCMA).

This provides the advantage that a possible collision of the RRC connection resume request message in physical layer with time/frequency resource allocated to other UEs can be avoided. Hence, fast access to the network can be realized that may be needed during emergency situations.

According to a second aspect, the invention relates to a radio access network (RAN) entity, in particular a base station (BS), comprising: a transceiver configured to transceive radio resource control (RRC) messages between a user equipment (UE), in particular a UE according to one of claims 1 to 16, and the RAN entity; and a radio resource controller configured to determine a special situation, in particular a congestion situation or a power saving situation, of the RAN entity, wherein the radio resource controller is configured to indicate a non-special situation, in particular a non-congestion situation or a non-power saving situation, to the UE to enable the UE activating an operation mode of the UE responsive to processing a first sequence of RRC messages, wherein the radio resource controller is configured to indicate a special situation, in particular a congestion situation or a power saving situation, to the UE to enable the UE activating the operation mode of the UE responsive to processing a second sequence of RRC messages, wherein a latency for processing the second sequence of RRC messages is less than a latency for processing the first sequence of RRC messages.

By processing the second sequence of RRC messages in a congestion or power saving situation which second sequence has a less processing latency than the first sequence of RRC messages, this latency reduction results in faster processing and therefore resolving of congestion. When the congestion or power down situation is over, which can be determined by the RAN and indicated to the UE, the UE can change to the normal state for processing the first sequence of RRC messages which have higher latency requirements.

However, these higher latency requirements can be fulfilled in the normal situation where no congestion is detected or the UE is not in power-down mode.

In a first possible implementation form of the RAN entity according to second aspect, the radio resource controller is configured to determine the congestion for a side link connection of the UE based on determining an energy level in radio resources over which communication takes place, in particular based on a channel busy ratio (CBR).

This provides the advantage of a simple and effective measure to detect a congestion situation.

In a second possible implementation form of the RAN entity according to second aspect as such or according to the first implementation form of the second aspect, the radio resource controller is configured to fetch a RAN context from the UE and to use information of the fetched RAN context for resuming an RRC connection to the UE.

This provides the advantage that the RAN entity can use the stored RAN context for resuming the RRC connection to the UE. By using the stored RAN context, the RAN does not have to start from scratch; this saves signaling messages and therefore reduces latency.

In a third possible implementation form of the RAN entity according to second aspect as such or according to the first implementation form of the second aspect, the radio resource controller is configured to fetch a RAN context from the UE and to use information of the fetched RAN context for providing resources indicated by the RAN context to other UEs.

This provides the advantage that the RAN entity can exploit information from the fetched RAN context for providing resources to other UEs. Hence, the RAN entity does not have to start from scratch when connecting the other UEs; this saves signaling messages and therefore reduces latency.

In a fourth possible implementation form of the RAN entity according to any of the second to the third implementation forms of the second aspect, the radio resource controller is configured to update a RAN context stored by the RAN based on information of the RAN context fetched from the UE.

This provides the advantage that by updating the RAN context stored by the RAN based on information of the RAN context fetched from the UE, the RAN context stored by the RAN indicates the actual situation of RRC connections. The RAN entity can react quickly to changes in the communication system.

BRIEF DESCRIPTION OF THE DRAWINGS

Further embodiments of the invention will be described with respect to the following figures, in which.

DETAILED DESCRIPTION

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
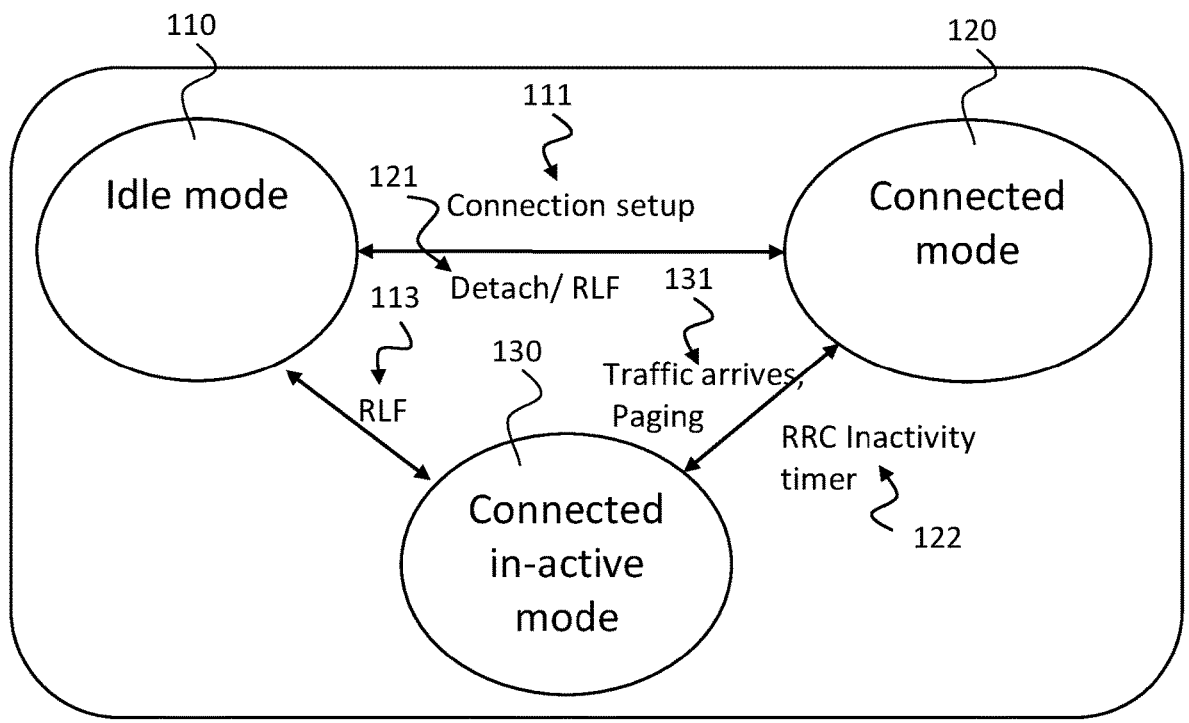
FIG. 1 shows a state diagram 100 illustrating state transitions of a UE according to a 5G RAN design.

FIG. 1 shows a state diagram 100 illustrating state transitions of a UE according to a 5G RAN design.

The state model 100 is introduced for the 5G Access enabling an efficient UE sleeping, a fast and lightweight transition from sleeping to active states and joint access optimizations. The state model 100 consists of three states: Idle mode (RRC IDLE) 110, Connected mode (RRC_CONNECTED) 120 and Connected in-active mode (RRC_CONNECTED_INACTIVE) 130. In the state model 100 the state transitions Connection setup 111 and Detach/RLF 121 from Idle mode 110 to Connected mode 120 and back to Idle mode 110 are expected to occur mainly during the first initial access (e.g. when the UE attaches to the network) or as a fallback case (e.g. when the devices and/or network cannot use the previously stored RAN context). As a consequence, this transition is not expected to occur as often as in LTE.

On the other hand, transitions Traffic arrives, paging 131 and RRC Inactivity timer 122 from Connected in-active mode 130 to Connected mode 120 and back to Connected in-active mode 130 are expected to occur quite often and should be optimized as a lightweight and fast transition. Details of this optimization procedure are described in the following.

A further transition RLF (Radio Link Failure) 113 is between Connected in-active mode 130 and Idle mode 110. This transition is expected to occur very rarely. When RLF 113 happens, UE shall initiate an RRC Connection Re-establishment procedure and inform upper layers about the release of RRC connection.

Figure 2:
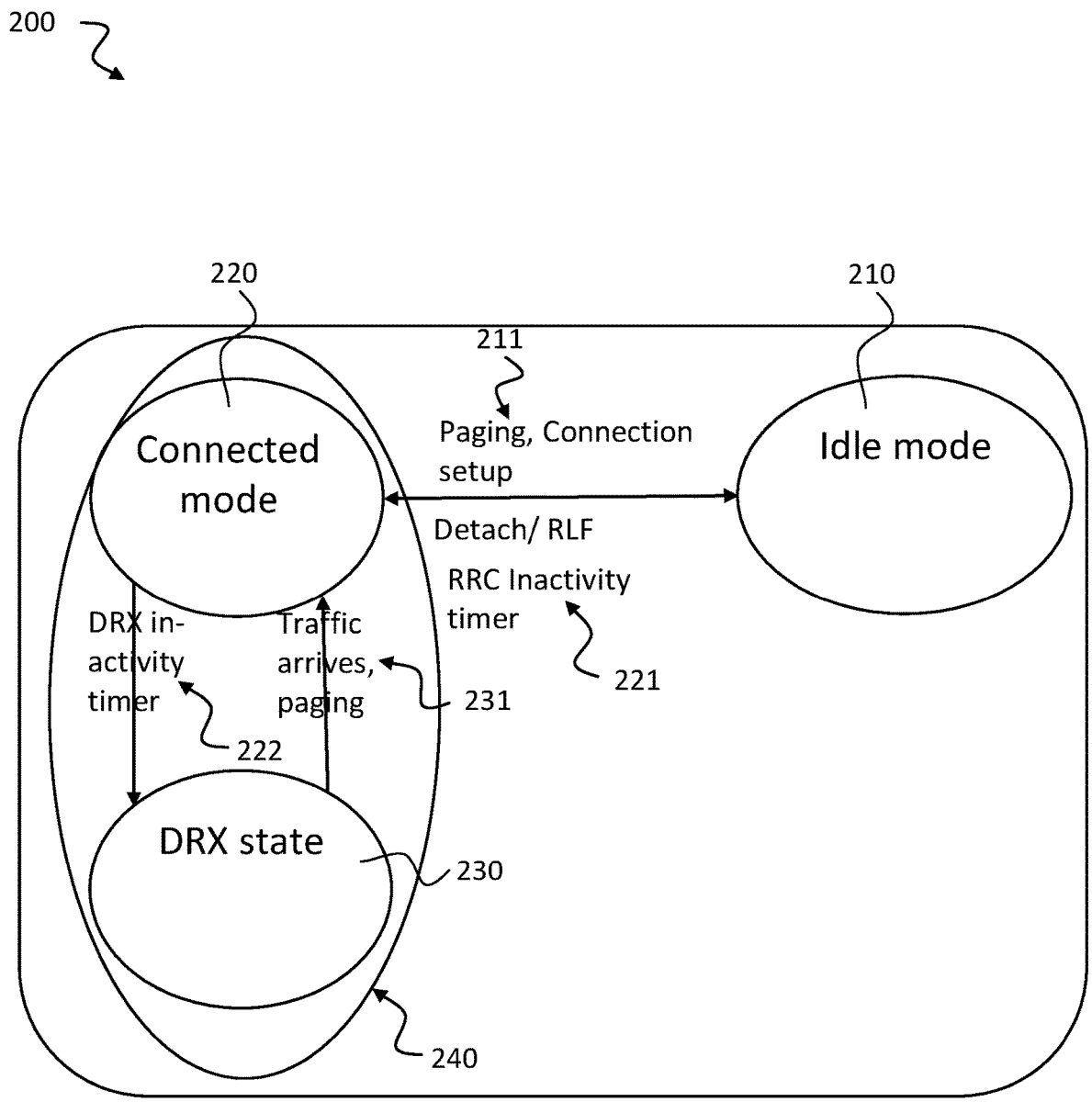
FIG. 2 shows a state diagram 200 illustrating state transitions of a UE according to an LTE RAN design.

FIG. 2 shows a state diagram 200 illustrating state transitions of a UE according to an LTE RAN design. Currently, LTE supports these three different states "Idle mode" 210, "Connected mode" 220 and "DRX state" 230. In the Idle mode 210 the UE location is not known in the RAN and in the connected mode 220 the UE has an ongoing RAN connection. Transfer from Idle mode 210 to connected mode 220 is via paging, connection setup 211 and transfer back to Idle mode 210 is via detaching, RLF or RRC inactivity timer 221.

In "Idle mode" 210, only CN (core network) context is stored when the UE is sleeping. UE and network discards the RAN context information when moving to this state. The UE is known at the network only on tracking area level and may move within the cells belonging to the tracking area without informing the network. The UE would, nevertheless, camp in the best cell via cell reselection procedure based on the configuration provided by the network.

In the connected mode 220, the UE is known on a cell level and mobility is fully network controlled (via handovers). RAN context is present. In this state 220 transition to DRX state 230 (e.g. depending on DRX inactivity timer 222) is used for micro-sleeping periods 240 between bursts of data of better resource utilization. For instance, during a web session short DRX cycles can allow for faster response when data transfer is resumed (traffic arrives, paging 231) instead of wasting resources to continuously monitor downlink channels (e.g. PDCCH) while the user is reading a downloaded web page. On the other hand, due to the uncertainties of the traffic demands, DRX state 230 can lead to delays when the network wants to reach the UE (e.g. if there is incoming traffic). A DRX cycle consists of "on periods" during which the UE monitors downlink channels and physical signals (so that it can be reached by the network via paging among other actions) and "sleeping periods" when the UE can switch its receivers off.

Figure 3:
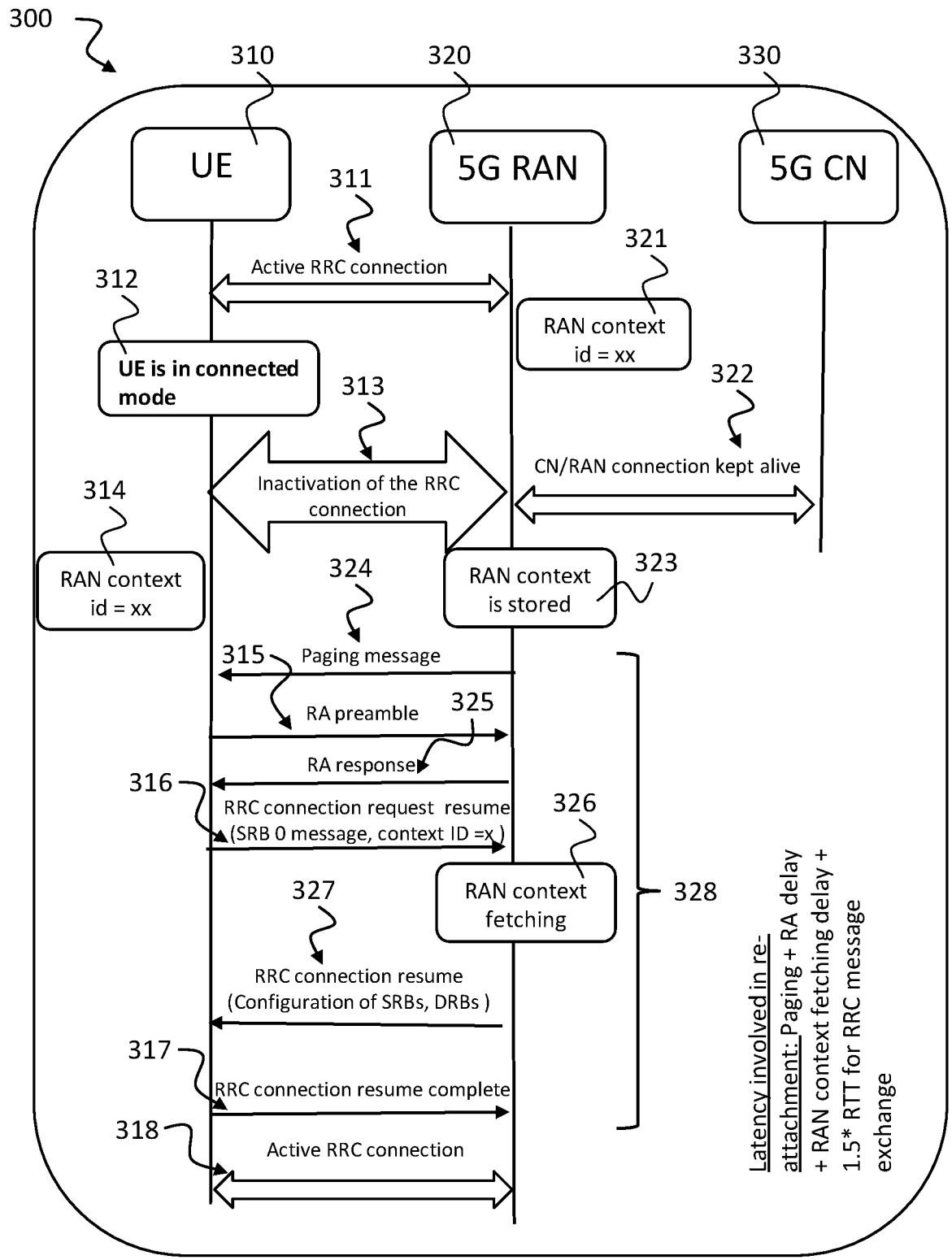
FIG. 3 shows a message sequence diagram 300 illustrating messaging between a UE 310, a 5G RAN 320 and a 5G core network (CN) 330 according to the 5G RAN design.

FIG. 3 shows a message sequence diagram illustrating messaging between a UE 310, a 5G RAN 320 and a 5G core network (CN) 330 according to the 5G RAN design.

When an active RRC connection 311 is established between UE 310 and 5G RAN 320, the RAN context identification 321 related to this connection is provided to the 5G RAN 320 and the UE 310 is in connected mode 312 according to the connected mode 120 of the state diagram 100 described above with respect to FIG. 1.

When the RRC connection is inactivated 313 between UE 310 and 5G RAN 320, the CN/RAN connection is kept alive between 5G RAN 320 and CN 330, the RAN context related to this RRC connection is stored 323 by the 5G RAN 320 and the RAN context identification 314 related to this connection is provided to the UE 310.

For a further activation of an RRC connection, the following message sequence, also referred to herein as first message sequence 328 is performed: A paging message 324 is sent from 5G RAN 320 to UE 310. The UE 310 send a RA (random access) preamble 315 to the 5G RAN 320 which responds with a RA response 325. An RRC connection request resume message 315 with SRB 0 message and context ID of RAN context 314 is sent from UE 310 to the 5G RAN 320 which allows the 5G RAN 320 to fetch the RAN context 326. Then the 5G RAN 320 sends an RRC connection resume message 327 with configuration of static radio bearers (SRBs) and dynamic radio bearers (DRBs) to the UE 310 which answers with an RRC connection resume complete message 317. This indicates that a new active RRC connection 318 is established. A latency of the first message sequence 328, i.e. for re-attachment of the RRC connection corresponds to the duration of paging, RA delay, RAN context fetching delay and 1.5 RTT (round trip time) for RRC message exchange.

The RRC connected in-active mode 130 described above with respect to FIG. 1 is being under discussion in 5G RAN2 as part of extended DRX mode for MTC. During connected in-active mode 130, dedicated SRBs and DRBs connections are released but the connection between RAN 320 and CN 330 is retained 322 as shown in FIG. 3. When the paging message 324 arrives at the RAN 320 a connection request resume 316 (re-activation) is initiated to reconfigure SRBs and DRBs.

The transition from connected in-active mode 130 to connected mode 120 is based on Traffic arrival & Paging 131. The transition from connected mode 120 to connected in-active mode 130 is based on RRC in-activity timer 122 when network happens to detect that there is no user plane traffic. The latency due to Paging and Random access (messages 324, 315, 325 shown in FIG. 3) during congested scenario is very high for V2x.

A significant improvement can be made by better exploiting RAN memory and traffic pattern during congestion scenario instead of depending on in-activity timer and initiating paging when user data arrives. This improvement is related to a modified state diagram 400 including a further state, referred to as "Semi-persistent mode" 440 as described below with respect to FIGS. 4 to 6.

Figure 4:
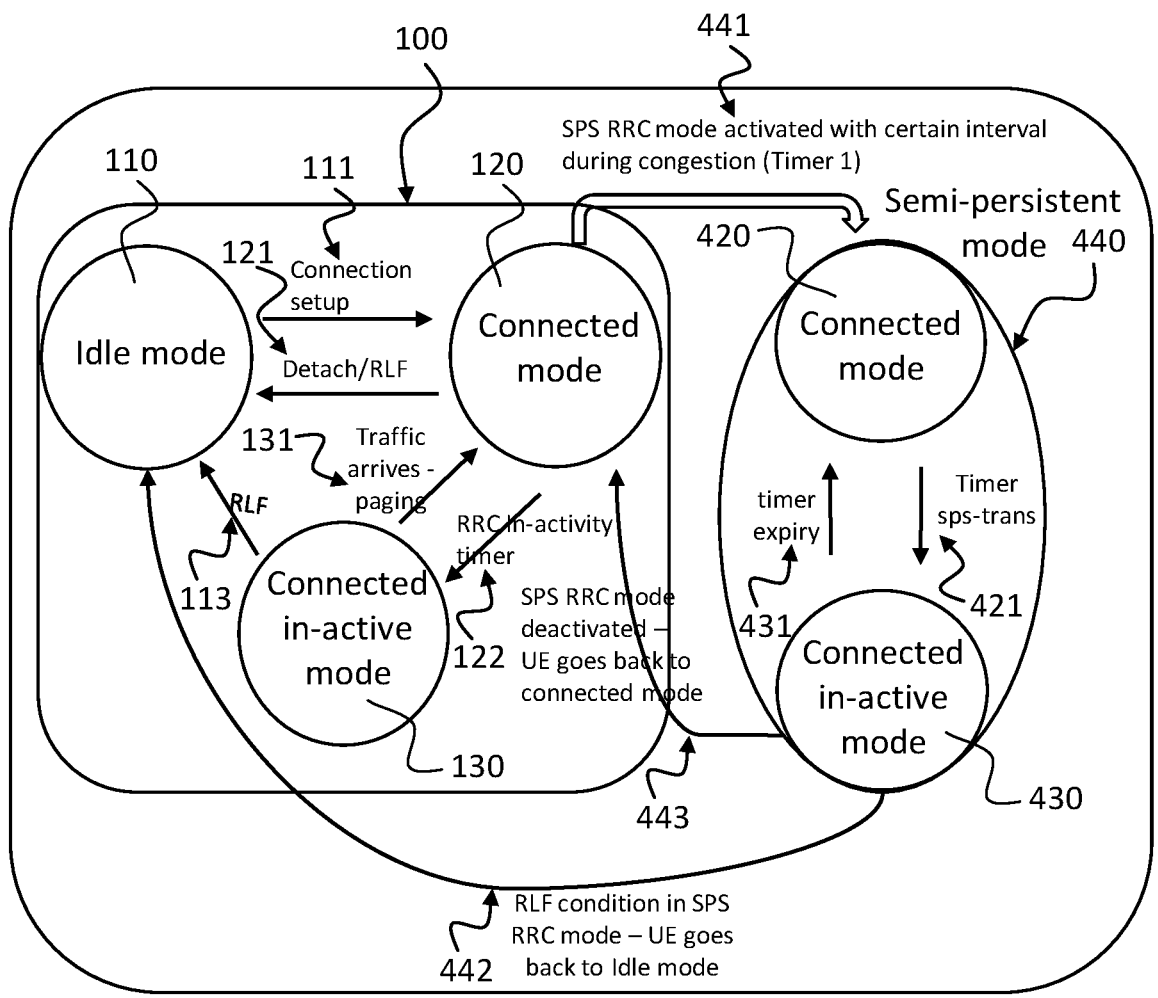
FIG. 4 shows a state diagram 400 illustrating state transitions of a UE according to the disclosure.

FIG. 4 shows a state diagram 400 illustrating state transitions of a UE according to the disclosure.

This state diagram 400 includes the states and state transitions of the state diagram 100 described above with respect to FIG. 1 and further includes an additional state referred to as "semi-persistent (SPS) mode" 440 including a connected mode 420 and a connected in-active mode 430 which correspond to the two states connected mode 120 and connected in-active mode 130 described above with respect to FIG. 1. The SPS RRC mode 440 is activated 441 with certain interval during congestion depending on a first timer (Timer 1). I.e. Timer 1 specifies the interval of activating the SPS RRC mode 440. In SPS RRC mode 440 transition between connected mode 420 and connected in-active mode 430 is controlled by a second timer (Timer 2). Timer 2 specifies the periodicity of transition 421 from connected mode 420 to connected in-active mode 430. Timer 2 expiry 431 causes transition from connected in-active mode 430 back to connected mode 420.

A deactivation 443 of SPS RRC mode 440 results in a transition from the SPS mode 440 back to the connected mode 120 of the normal state diagram 100 while a radio link failure (RLF) condition in the SPS RRC mode 440 results in a transition from the SPS mode 440 back to the idle mode 110 of the normal state diagram 100.

By activating the SPS RRC mode 440 described above the following advantages can be realized: In a scenario of a heavy traffic jam, where the UEs are nearly static or moving slowly leading to very small variation in the TA (timing advance), when BS senses heavy load due to above reason it can trigger the Semi-Persistent RRC mode 440. In another scenario, BS triggers SPS RRC mode 440 to trigger periodic downlink and uplink small data transmission during a power saving mode. To minimize the energy consumption the SPS RRC mode can be activated where the MTC device can do periodic state transition by avoiding to monitor the paging messages from the network. The Semi-persistent mode 440 as shown in FIG. 4 manages periodic transition between RRC connected mode 420 and connected in-active mode 430. Periodic activation and release of dedicated SRBs & DRBs in semi-persistent RRC mode 440 can help the BS to provide opportunities for all congested UEs to transmit data. RAN memory and periodic traffic pattern are exploited during congestion scenario by activating the semi-persistent RRC mode 440. The periodic SPS mode 440 helps congested UEs to access the network while utilizing the resources such as SRBs, DRBs, Control channel/data channel during the transient period.

By applying the state diagram 400 described above, the following functionality can be realized: The semi-persistent mode 440 can manage periodic transition between connected mode 420 to connected in-active mode 430. The SPS mode 440 helps congested UEs to access the network while utilizing the resources such as SRBs, DRBs, Control channel/data channel during the transient period. The RAN, e.g. the Base-station of the RAN can calculate the SPS timer periodicity based on the packet arrival which may be measured with the Buffer status report from UE.

SPS RRC mode 440 can be triggered during congestion by BS with calculating the number of RRC connection request failure with a pre-defined threshold from admission control. SPS RRC mode can also be triggered for the MTC device for energy saving purpose for periodic data transmission. RAN controlled SPS mode as described below with respect to FIG. 5 and UE controlled SPS mode as described below with respect to FIG. 6 can provide fast access to the network for re-attachment with stored context. I.e., no Paging and no RACH procedure is required as described below with respect to FIGS. 5 and 6. A stored RAN context like TA, BSR can continuously be updated with measurement report from UE that can help in adapting the SPS timer periodicity.

Figure 5:
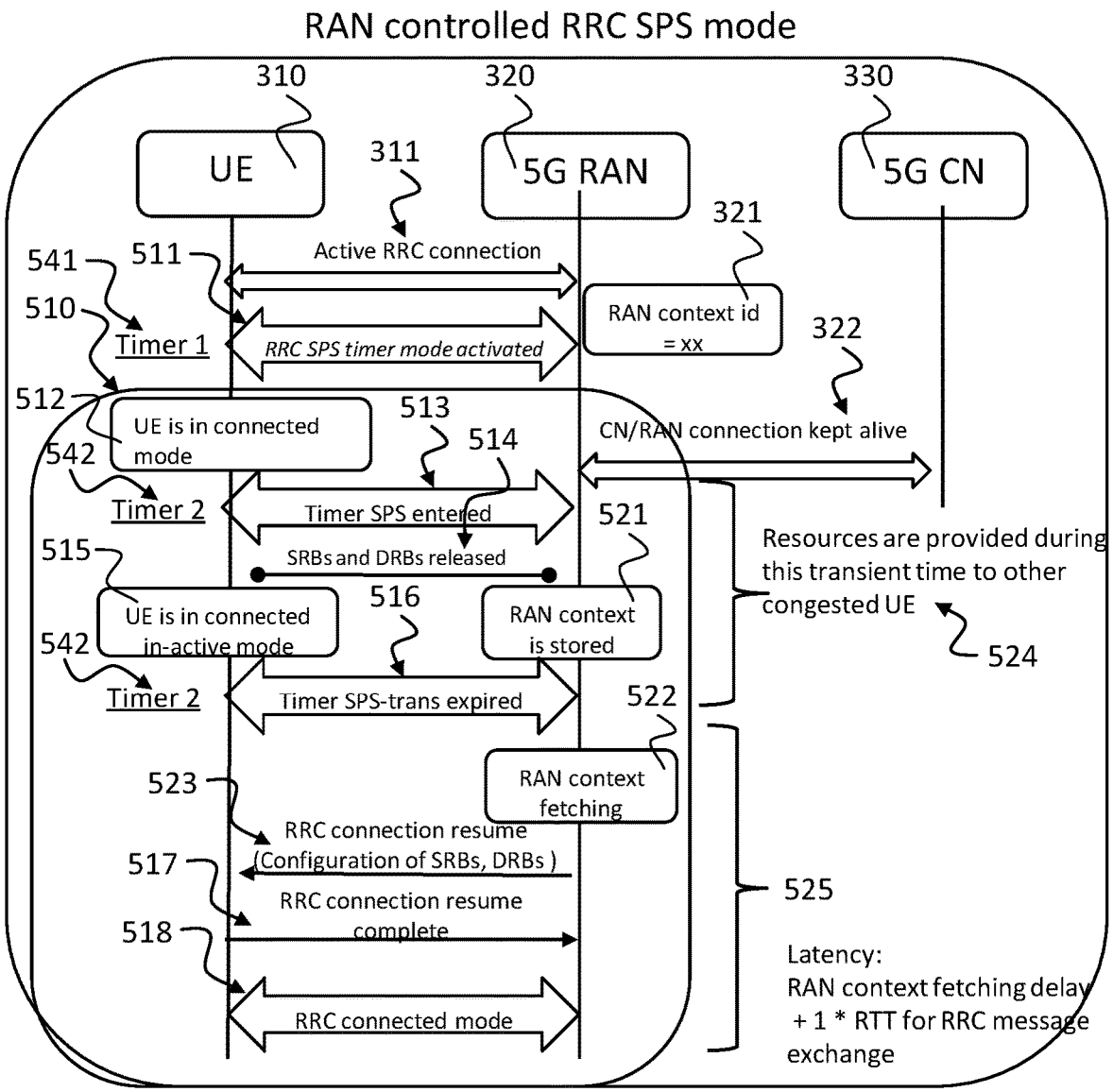
FIG. 5 shows a message sequence diagram 500 illustrating messaging between a UE 310, a 5G RAN 320 and a 5G core network (CN) 330 according to the disclosure when an RRC SPS mode 440 is controlled by the RAN 320.

FIG. 5 shows a message sequence diagram 500 illustrating messaging between a UE 310, a 5G RAN 320 and a 5G core network (CN) 330 according to the disclosure when an RRC SPS mode 440 is controlled by the RAN 320. The SPS mode 440 corresponds to the state 440 of the state diagram 400 described above with respect to FIG. 4.

When an active RRC connection 311 is established between UE 310 and 5G RAN 320, the RAN context identification 321 related to this connection is provided to the 5G RAN 320. When the SPS mode 510 (corresponding to the SPS mode 440 described above with respect to FIG. 4) is configured by the RAN 320 the first timer (Timer 1) 541 activates 511 RRC SPS timer mode between UE 310 and 5G RAN 320 as described above with respect to FIG. 4. Then the UE 310 is in connected mode 512 according to the connected mode 420 of the state diagram 400 described above with respect to FIG. 4. The CN/RAN connection between CN 330 and RAN 320 is kept alive 322 as described above with respect to FIG. 3. The second timer (Timer 2) 542, as described above with respect to FIG. 4, initiates a release 514 of SRBs and DRBs and a transition from connected mode 420 to connected in-active mode 430. Hence, the UE is in connected-in active mode 515 and the RAN context related to this RRC connection is stored 521 by the 5G RAN 320. During this transient time 524 of transition from connected mode 420 to connected in-active mode 430, resources can be provided to other congested UEs by the 5G RAN 320.

When the second timer 542 expires 516, for a further activation of an RRC connection, the following message sequence, also referred to herein as second message sequence 525 is performed: 5G RAN 320 fetches the RAN context 522 of this RRC connection; an RRC connection resume message 523 with configuration of SRBs and DRBs is sent from 5G RAN 320 to UE 310 which answers with an RRC connection resume complete message 517. This indicates that a new active RRC connection 518 is established. The UE is back in RRC connected mode 420. A latency of the second message sequence 525, i.e. for re-attachment of the RRC connection corresponds to the duration of RAN context fetching 522 delay and 1.0 RTT (round trip time) for RRC message exchange 523, 517.

By applying the message sequence diagram 500 described above, the following functionality of the network can be realized: The RAN 320 configures UE 310 with RRC SPS timer mode with certain periodicity (Timer 1), 541. So UE 310 can periodically transit between connected inactive mode 430 and connected mode 420. The RAN context may be stored 521 in the RAN 320, e.g. the base-station and SRBs, DRBs may be released 514 while BS can provide those resources 524 to other congested UEs. Since RAN 320 can control the SPS timer duration, RAN 320 can send RRC connection resume 327 (with configuration of SRBs, DRBs) from the knowledge of the stored RAN 521 context to UE 310 for re-attachment. The base-station may calculate the SPS timer periodicity (Timer 2), 542 based on e.g. the packet arrival which can be measured from the Buffer status report (BSR) from UE, for example. BSR can provide the type of traffic. Buffer status report from UE 310 can be used to determine the periodicity of the SPS timer 542. The RAN 320 can update the SPS timer 542 periodicity based on the updated BSR report from UE 310. The RAN 320 can store the context information of the UE 310 such as security keys, UE capability info, Timing advance during the transition period, etc. Resuming the connection from in-active mode 430 does not require re-starting Paging, RACH procedure (as described above with respect to FIG. 3) because a situation of static or slow moving cars is assumed. BS can update stored RAN context 521 with measurement report from UE 310 such as BSR, Timing advance information from UE 310 in stored RAN context 521 during the periodic connected mode 420 and adapt Timer 1 (541) and Timer 2 (542).

Figure 6:
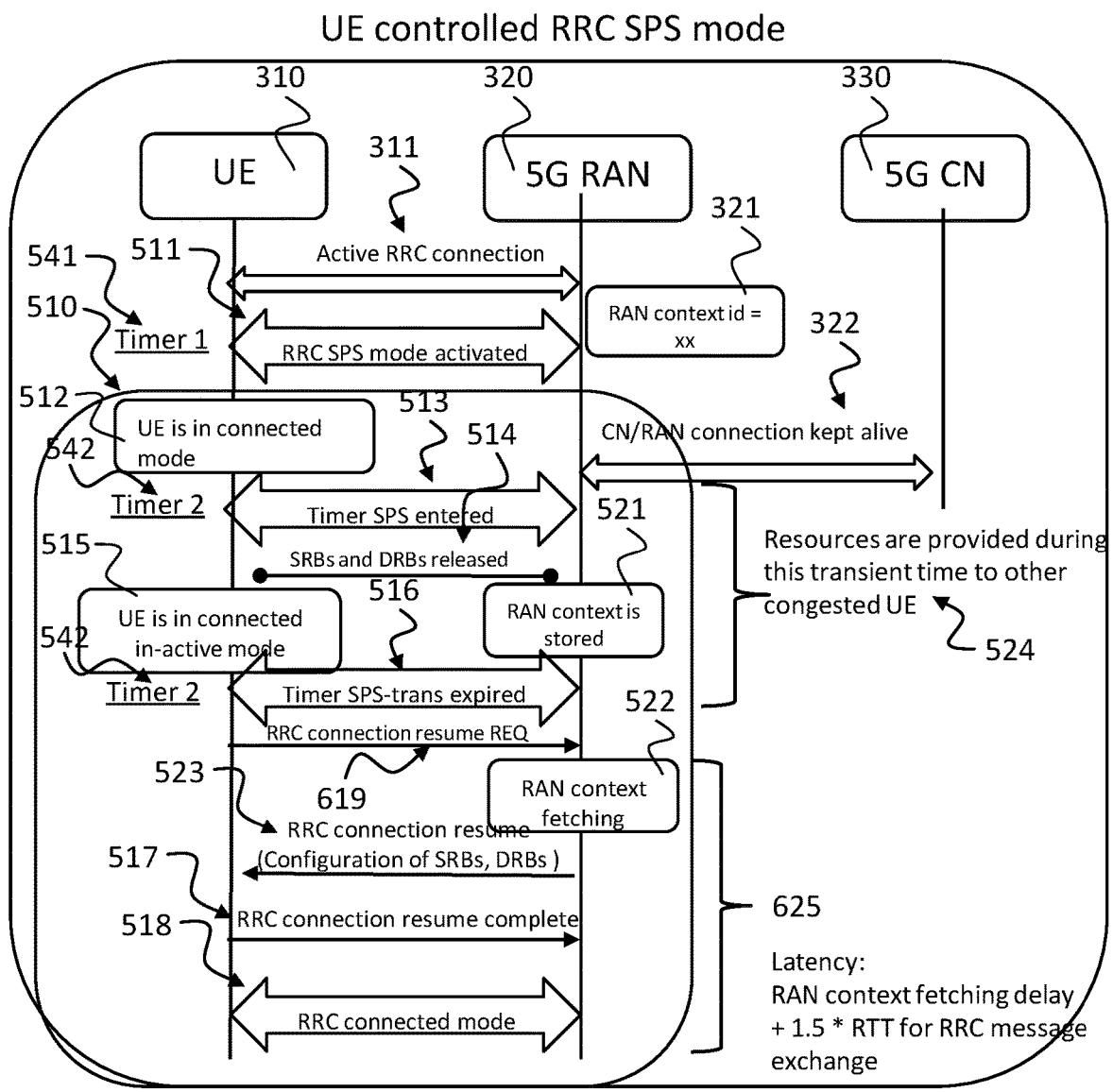
FIG. 6 shows a message sequence diagram 600 illustrating messaging between a UE 310, a 5G RAN 320 and a 5G core network (CN) 330 according to the disclosure when an RRC SPS mode 440 is controlled by the UE 310.

FIG. 6 shows a message sequence diagram 600 illustrating messaging between a UE 310, a 5G RAN 320 and a 5G core network (CN) 330 according to the disclosure when an RRC SPS mode 440 is controlled by the UE 310. The RRC SPS mode 440 corresponds to the state 440 of the state diagram 400 described above with respect to FIG. 4.

The messages of the message sequence diagram 600 correspond to the messages of the message sequence diagram 500 described above with respect to FIG. 5 for the case that the RRC SPS mode 440 is controlled by the RAN 320. Additionally, an RRC connection resume request message 619 is initiated by the UE to trigger the RAN 320 to perform the processing of the second message sequence 525. Adding this extra message from UE to RAN to the second message sequence 525 results in an extended second message sequence 625 which includes the RRC connection resume request message 619, the RAN context fetching 522, the RRC connection resume message 523 with configuration of SRBs and DRBs and the RRC connection resume complete message 517. A latency of this extended second message sequence 625, i.e. for re-attachment of the RRC connection, corresponds to the duration of RAN context fetching 522 delay and 1.5 RTT (round trip time) for RRC message exchange 619, 523, 517. I.e., a duration of the extended second message sequence 625 is by half the round trip time longer than the duration of the second message sequence 525 for the RAN controlled RRC SPS mode described in FIG. 5 due to the additional RRC connection resume request message 619.

By applying the message sequence diagram 600 described above, the following functionality of the network can be realized: The RRC SPS mode 440, 510 can be activated when the RAN 320, e.g. a base station (BS) of the RAN 320, senses congestion, e.g. by calculating the RRC connection request failure against a pre-defined threshold for C-V2x. In the case of PC5, Channel busy ratio (CBR) measurement report from D2D UEs can be used, for example, to sense congestion, e.g. as described below. An admission control algorithm in BS may rejects UE's connection request when a maximum number of connected users is achieved. Maintaining a certain QoS (quality of service) target (with respect to latency, reliability) is also very important for V2x. In UE controlled RRC SPS mode as shown in FIG. 6, after the expiration of the SPS timer 542, i.e. Timer 2, UE 310 can send RRC connection resume request 619 to the BS for resuming the connection. This RRC message, however, may result in collision in physical layer with time/frequency resource allocated to other UEs. Hence, predefined resource blocks (RBs) or grant free SCMA may be needed to transmit the RRC connection resume request 619. This message 619 can be used, for example, for fast access to network when needed during emergency situation.

The channel occupancy level can be obtained by measuring the energy level in the radio resources over which the communications takes place. As a baseline, a measure called Channel Busy Ratio (CBR) can be defined and determined as follows: $N_p$ probes of the receive signal are taken uniformly distributed within the measuring interval $T_m$. For all channel probes (of length $T_p$) the average signal level S is determined. CBR is measured for the receive signal level threshold $S_{th}$ and given as:

$$CBR(S_{th}) = \frac{\sum (1 \forall \text{ probes with } S > S_{th})}{N_p}$$

In an exemplary implementation, the limiting values for the above parameters can be as follows: $T_p=8$ μs, $T_m=100$ ms, $S_{th}<=-85$ dBm.

Figure 7:
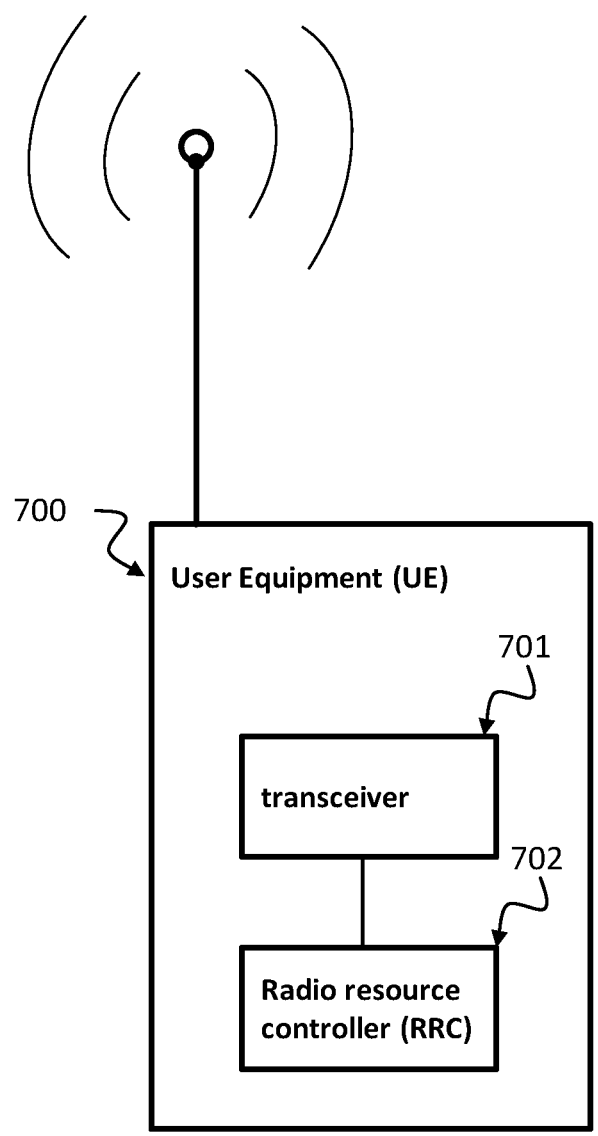
FIG. 7 shows a schematic diagram illustrating a User Equipment 700 according to the disclosure.

FIG. 7 shows a schematic diagram illustrating a User Equipment (UE) 700 according to the disclosure. The UE may correspond to the UE 310 described above with respect to FIGS. 3 to 6. The UE 700 includes a transceiver 701 and a radio resource controller (RRC) 702.

The transceiver 701 is configured to transceive radio resource control (RRC) messages between the UE 700 and a radio access network RAN, e.g. a 5G RAN 320 as described above with respect to FIGS. 3 to 6.

The radio resource controller 702 is configured to activate an operation mode of the UE 700 responsive to processing a first sequence of RRC messages, e.g. a first sequence 328 described above with respect to FIG. 3, when a non-congestion situation is indicated by the RAN. The radio resource controller 702 is configured to activate the operation mode of the UE 700 responsive to processing a second sequence of RRC messages, e.g. a second sequence 525 described above with respect to FIG. 5 or an extended second sequence 625 described above with respect to FIG. 6, when a special situation, in particular a congestion situation or a power saving situation, is indicated by the RAN. A latency for processing the second sequence 525, 625 of RRC messages is less than a latency for processing the first sequence 328 of RRC messages.

The processing of the first sequence 328 of RRC messages may include paging messaging 324, random access (RA) messaging 315, 325, RRC messaging 316, 327, 317 and RAN context fetching 326, e.g. as described above with respect to FIG. 3. The processing of the second sequence 525, 625 of RRC messages may include RRC messaging 523, 517, 619 and RAN context fetching 522, e.g. as described above with respect to FIGS. 5 and 6.

The radio resource controller 702 may be configured to omit paging messaging 324 and RA messaging 315, 325 when processing the second sequence 525, 625 of RRC messages in order to reduce a latency for activating the operation mode of the UE 700.

The operation mode of the UE 700 may be activated by attaching the UE 700 to the RAN, in particular by a state change of the UE 700 from RRC connected in-active mode 130, 430 to RRC connected mode 120, 420, e.g. as described above with respect to FIG. 4.

The radio resource controller 702 may be configured to activate periodic transition between the RRC connected mode 420 and the RRC connected in-active mode 430 when a congestion situation or a power saving situation is indicated by the RAN.

The radio resource controller 702 may be configured to periodically activate and release radio bearers, in particular at least one static radio bearer (SRB) and/or at least one dynamic radio bearer (DRB), when a congestion situation or a power saving situation is indicated by the RAN.

The transceiver 701 may be configured to transmit measurement reports, in particular including buffer status report (BSR) information and Timing advance information to the RAN in RRC connected mode 420 to enable the RAN updating a RAN context 521 based on the measurement reports.

The radio resource controller 702 may be configured to change the operation mode of the UE 700 based on a state machine, e.g. a state machine 400 as described above with respect to FIG. 4. This state machine 400 includes a semi-persistent (SPS) RRC mode 440 associated with the processing of the second sequence 525, 625 of RRC messages and a normal RRC mode 100 associated with the processing of the first sequence 328 of RRC messages.

The radio resource controller 702 may be configured to periodically activate the SPS RRC mode 440 when a congestion situation or a power saving situation is indicated by the RAN.

The radio resource controller 702 may be configured to change the operation mode of the UE 700 from the SPS RRC mode 440 to the normal RRC mode 100 responsive to a first timer expiry event of a first timer 541, e.g. as described above with respect to FIGS. 4 to 6. The first timer 541 may be is configurable by the RAN.

The radio resource controller 702 may be configured to periodically activate changing of the operation mode of the UE 700 from RRC connected mode 420 to RRC connected in-active mode 430 when the UE 700 is in the SPS RRC mode 440.

The radio resource controller 702 may be configured to change the operation mode of the UE 700 from the RRC connected in-active mode 430 to the RRC connected mode 420 responsive to a second timer expiry event of a second timer 542, e.g. as described above with respect to FIGS. 4 to 6.

The radio resource controller 702 may be configured to release radio bearers 514, in particular at least one static radio bearer (SRB) and/or at least one dynamic radio bearer (DRB), for usage by another UE during activity of the second timer 542, e.g. as described above with respect to FIGS. 5 to 6.

The radio resource controller 702 may be configured to transmit an RRC connection resume request message 619 to the RAN for resuming an RRC connection to the RAN responsive to the second timer expiry event, e.g. as described above with respect to FIG. 6.

The radio resource controller 702 may be configured to transmit the RRC connection resume request message 619 based on predefined radio resource blocks and/or grant free subcarrier multiple access (SCMA).

Figure 8:
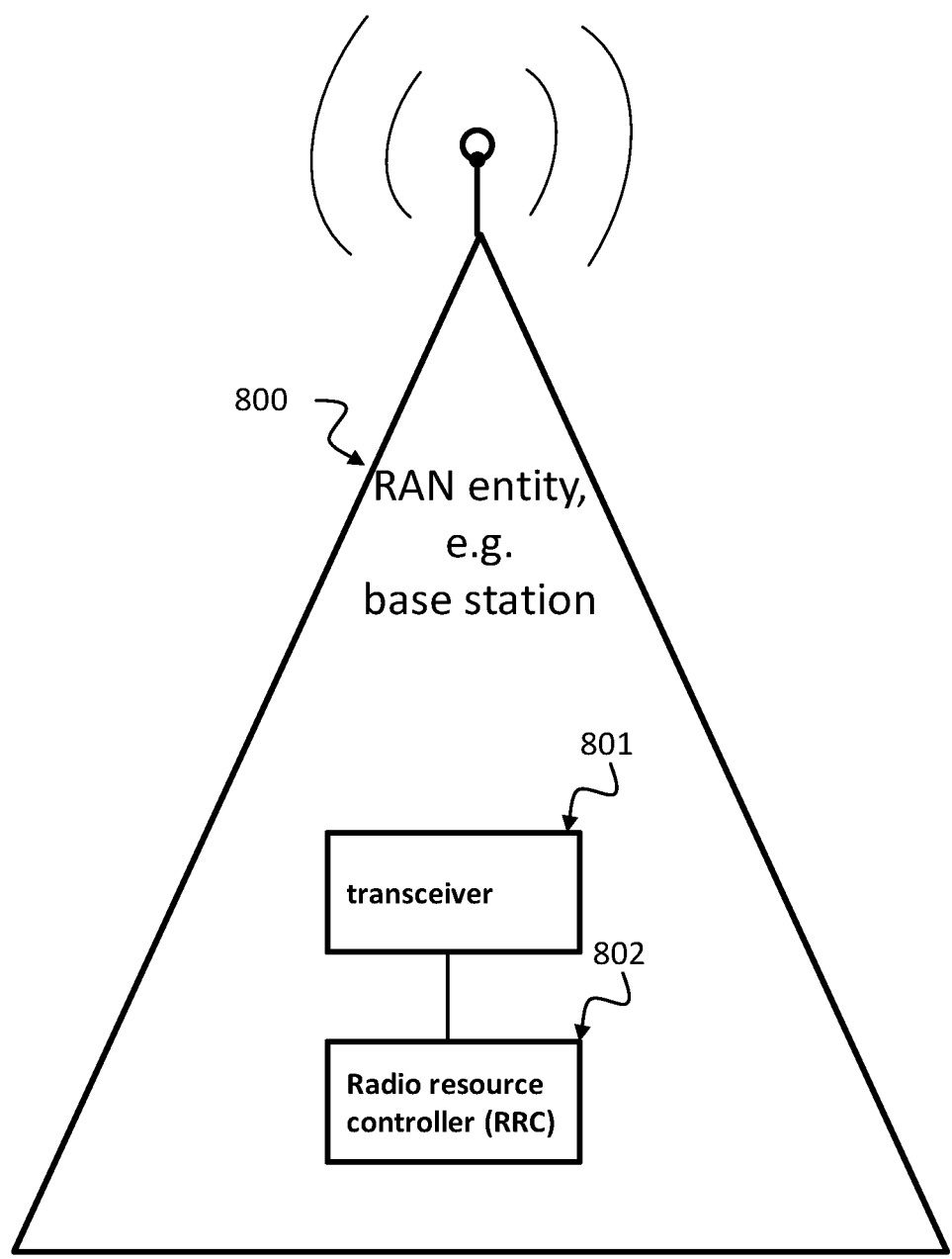
FIG. 8 shows a schematic diagram illustrating a RAN entity 800, e.g. a base station, according to the disclosure.

FIG. 8 shows a schematic diagram illustrating a RAN entity 800, e.g. a base station, according to the disclosure. The RAN entity 800 may correspond to the 5G RAN 320 described above with respect to FIGS. 3 to 6. The RAN entity 800 includes a transceiver 801 and a radio resource controller (RRC) 802.

The transceiver 801 is configured to transceive radio resource control (RRC) messages between a user equipment UE, in particular a UE 700 as described above with respect to FIG. 7, and the RAN entity 800.

The radio resource controller 802 is configured to determine a special situation, in particular a congestion situation or a power saving situation, of the RAN entity 800. The radio resource controller 802 is configured to indicate a non-special situation, in particular a non-congestion situation or a non-power saving situation, to the UE 700 to enable the UE 700 activating an operation mode of the UE 700 responsive to processing a first sequence 328 of RRC messages, e.g. as described above with respect to FIGS. 3 and 7. The radio resource controller 802 is configured to indicate a special situation, in particular a congestion situation or a power saving situation, to the UE 700 to enable the UE 700 activating the operation mode of the UE 700 responsive to processing a second sequence 525, 625 of RRC messages, e.g. as described above with respect to FIGS. 4, 5 and 7. A latency for processing the second sequence 525, 625 of RRC messages is less than a latency for processing the first sequence 328 of RRC messages.

The radio resource controller 802 may be configured to determine the congestion for a side link connection of the UE 700 based on determining an energy level in radio resources over which communication takes place, in particular based on a channel busy ratio (CBR), e.g. as described above with respect to FIG. 6.

The radio resource controller 802 may be configured to fetch a RAN context 326 from the UE 700 and to use information of the fetched RAN context 326 for resuming 327 an RRC connection to the UE 700, e.g. as described above with respect to FIGS. 4 to 7. The radio resource controller 802 may be configured to fetch a RAN context 326 from the UE 700 and to use information of the fetched RAN context 326 for providing resources indicated by the RAN context 326 to other UEs, e.g. as described above with respect to FIGS. 4 to 7. The radio resource controller 802 may be configured to update a RAN context 323 stored by the RAN based on information of the RAN context 326 fetched from the UE 700, e.g. as described above with respect to FIGS. 4 to 7.

The present disclosure also supports a method for mitigating congestion in a radio access network (RAN). The method includes the following steps: activating an operation mode of a UE responsive to processing a first sequence 328 of RRC messages, e.g. as described above with respect to FIG. 3, when a non-congestion situation is indicated by the RAN; and activating the operation mode of the UE responsive to processing a second sequence 525, 625 of RRC messages, e.g. as described above with respect to FIGS. 5 and 6, when a special situation, in particular a congestion situation or a power saving situation, is indicated by the RAN, wherein a latency for processing the second sequence 525, 625 of RRC messages is less than a latency for processing the first sequence 328 of RRC messages.

The present disclosure also supports a computer program product including computer executable code or computer executable instructions that, when executed, causes at least one computer to execute the performing and computing steps described herein, in particular the steps of the method described above. Such a computer program product may include a readable non-transitory storage medium storing program code thereon for use by a computer. The program code may perform the processing and computing steps described herein, in particular the method described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A user equipment (UE), comprising:
a transceiver configured to transceive radio resource control (RRC) messages between the UE and a radio access network (RAN); and
a radio resource controller configured to:
  activate an operation mode of the UE responsive to processing a first sequence of RRC messages when a non-congestion situation is indicated by the RAN, and
  activate the operation mode of the UE responsive to processing a second sequence of RRC messages when a congestion situation or a power saving situation is indicated by the RAN,
wherein a latency for processing the second sequence of RRC messages is less than a latency for processing the first sequence of RRC messages.

2. The UE of claim 1,
wherein the first sequence of RRC messages comprises paging messaging, random access (RA) messaging, RRC messaging and RAN context fetching; and
the second sequence of RRC messages comprises RRC messaging and RAN context fetching.

3. The UE of claim 1, wherein the radio resource controller is configured to omit paging messaging and RA messaging when processing the second sequence of RRC messages to reduce a latency for activating the operation mode of the UE.

4. The UE of claim 1, wherein the operation mode of the UE is activated by attaching the UE to the RAN by a state change of the UE from an RRC connected in-active mode to an RRC connected mode.

5. The UE of claim 4, wherein the radio resource controller is configured to activate periodic transition between the RRC connected mode and the RRC connected in-active mode when the congestion situation or the power saving situation is indicated by the RAN.

6. The UE of claim 4, wherein the radio resource controller is configured to periodically activate and release radio bearers that comprise at least one of a static radio bearer (SRB) or a dynamic radio bearer (DRB), when the congestion situation or the power saving situation is indicated by the RAN.

7. The UE of one of claim 4, wherein the transceiver is configured to transmit measurement reports to the RAN in the RRC connected mode, the measurement reports comprise buffer status report (B SR) information and Timing advance information, and the measurement reports are used by the RAN to update a RAN context.

8. The UE of claim 4, wherein the radio resource controller is configured to change the operation mode of the UE based on a state machine, the state machine comprises a semi-persistent (SPS) RRC mode associated with the processing of the second sequence of RRC messages and a normal RRC mode associated with the processing of the first sequence of RRC messages.

9. The UE of claim 8, wherein the radio resource controller is configured to periodically activate the SPS RRC mode when the congestion situation or the power saving situation is indicated by the RAN.

10. The UE of claim 9, wherein the radio resource controller is configured to change the operation mode of the UE from the SPS RRC mode to the normal RRC mode responsive to a first timer expiry event of a first timer.

11. The UE of claim 10, wherein the first timer is configurable by the RAN.

12. The UE of claim 8, wherein the radio resource controller is configured to periodically activate changing of the operation mode of the UE from the RRC connected mode to the RRC connected in-active mode when the UE is in the SPS RRC mode.

13. The UE of claim 12, wherein the radio resource controller is configured to change the operation mode of the UE from the RRC connected in-active mode to the RRC connected mode responsive to a second timer expiry event of a second timer.

14. The UE of claim 13, wherein the radio resource controller is configured to release radio bearers for usage by another UE during activity of the second timer, and the radio bearers comprise at least one of a static radio bearer (SRB) or a dynamic radio bearer (DRB).

15. The UE of claim 13, wherein the radio resource controller is configured to transmit an RRC connection resume request message to the RAN for resuming an RRC connection to the RAN responsive to the second timer expiry event.

16. The UE of claim 15, wherein the radio resource controller is configured to transmit the RRC connection resume request message based on predefined radio resource blocks or grant free subcarrier multiple access (SCMA).

17. A radio access network (RAN) entity, wherein the RAN entity is a base station (BS), the RAN entity comprises:
a transceiver configured to transceive radio resource control (RRC) messages between a user equipment and the RAN entity; and
a radio resource controller configured to:
  indicate a non-congestion situation or a non-power saving situation to the UE to enable the UE to activate an operation mode of the UE responsive to processing a first sequence of RRC messages;
  determine a congestion situation or a power saving situation of the RAN entity; and
  indicate the congestion situation or the power saving situation to the UE to enable the UE to activate the operation mode of the UE responsive to processing a second sequence of RRC messages, wherein a latency for processing the second sequence of RRC messages is less than a latency for processing the first sequence of RRC messages.

18. The RAN entity of claim 17, wherein the radio resource controller is configured to determine a congestion for a side link connection of the UE based on determining an energy level in radio resources over which communication takes place based on a channel busy ratio (CBR).

19. The RAN entity of claim 17, wherein the radio resource controller is configured to fetch a RAN context from the UE and to use information of the fetched RAN context for resuming an RRC connection to the UE.

20. The RAN entity of claim 17, wherein the radio resource controller is configured to fetch a RAN context from the UE and to use information of the fetched RAN context for providing resources indicated by the RAN context to other UEs.

21. The RAN entity of claim 19, wherein the radio resource controller is configured to update a RAN context stored by the RAN based on information of the RAN context fetched from the UE.

* * * * *

UNITED STATES PATENT AND TRADEMARK OFFICE
CERTIFICATE OF CORRECTION

PATENT NO. : 10,652,827 B2  
APPLICATION NO. : 16/510341  
DATED : May 12, 2020  
INVENTOR(S) : Karthikeyan Ganesan et al.

Page 1 of 1

It is certified that error appears in the above-identified patent and that said Letters Patent is hereby corrected as shown below:

In the Claims

Column 18, Line 7, Claim 7, delete "(B SR)" and insert -- (BSR) --, therefor.

Signed and Sealed this  
Twenty-first Day of July, 2020

Andrei Iancu  
*Director of the United States Patent and Trademark Office*